Jan. 8, 1963    R. M. WALKER    3,072,870
RECTANGULAR WAVEGUIDE BEND
Filed July 21, 1960
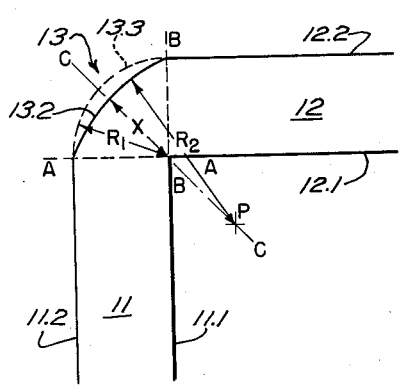
FIG. 1
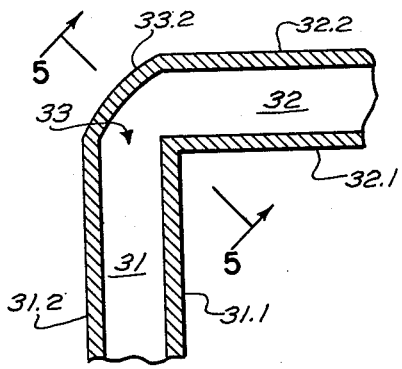
FIG. 4
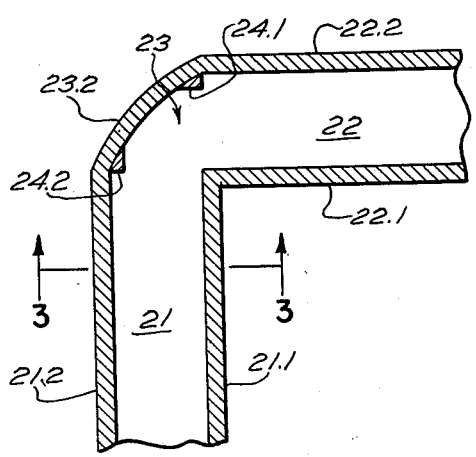
FIG. 2
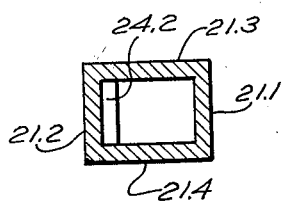
FIG. 3
FIG. 5
INVENTOR.
RICHARD M. WALKER
BY
ATTORNEY

United States Patent Office 3,072,870
Patented Jan. 8, 1963

3,072,870
RECTANGULAR WAVEGUIDE BEND
Richard M. Walker, Roxbury, Mass., assignor to Microwave Associates, Inc., Burlington, Mass., a corporation of Massachusetts
Filed July 21, 1960, Ser. No. 44,421
16 Claims. (Cl. 333—98)

This invention relates in general to rectangular waveguide bends, and more particularly to such bends made in the shortest possible length of waveguide with improved impedance matching over the frequency range of a waveguide operating in the fundamental mode.

When a wave guide is bent, a wave being propagated in it is subjected to perturbations which cause impedance mismatch. Many solutions to this problem have heretofore been proposed. For example, bends having very large radius compared to the guide wavelength of the energy to be propagated exist in which perturbations of the propagated waves is minimal and frequency sensitivity of the bend is not involved. These bends, however, require large amounts of space for their gradual curvature, and cannot be used where the required space does not exist, or is needed for other components. Bends of short radius, comparable to the guide wavelength, also exist, in which the bend length is controlled to provide half-wave matching. While these bends relax somewhat the space requirements, they tend to be frequency sensitive, and difficult to impedance match over the full frequency range. There exist also mitre bends, comparable in length to the guide wavelength, in which the mitre section is controlled to provide half-wave matching; these, too, are subject to frequency sensitivity. Mitre bends have been proposed which have zero inner-wall radius, and these, too, are frequency sensitive. In addition, there are post-compensated bends, having interior structures intended to achieve broader band matching; these introduce critical manufacturing tolerances.

It is the principal object of the present invention to provide a sharp bend having zero inner-wall radius and having superior broad-band characteristics. Another object of the invention is to provide such a bend in rectangular waveguide, in the E-plane or the H-plane, which has nearly perfect impedance match over the entire frequency range of a rectangular waveguide operating in the fundamental mode. Another object is to provide such a bend which is easy to construct and readily reproduced.

According to the invention, a bend is provided in which the inner-wall radius is zero or an abrupt junction, and the outer wall is curved on a radius which is larger than the "$a$" or "$b$" dimension of the basic rectangular waveguide, centered on a point within the inner-wall bend so located that the portion of the radius within the bend section lying on the bisector of the angle of the bend is shorter than the "$a$" or "$b$" dimension by a prescribed amount such that nearly perfect impedance matching results over the entire frequency range of the basic rectangular waveguide operating in the fundamental mode. Inductive iris compensation of such a bend is simple to accomplish with inductive elements associated with one or both narrow waveguide walls within the bend.

Other and further objects and features of the invention will become apparent from the following description of certain embodiments thereof. This description refers to the accompanying drawings, wherein:

FIG. 1 schematically illustrates the principle of the invention;

FIG. 2 is a longitudinal sectional view of an H-plane bend according to the invention;

FIG. 3 is a cross section along line 3—3 of FIG. 2;

FIG. 4 is a longitudinal sectional view of an E-plane bend according to the invention; and FIG. 5 is a cross section along line 5—5 of FIG. 4.

Referring now to FIG. 1, a rectangular waveguide bend comprises two straight rectangular waveguide sections 11 and 12 which are axially at right angles to each other, and an intermediate bent section 13 connected to both. The first straight waveguide section 11 may be considered to be joined to the intermediate section at a plane indicated by the dashed reference line A—A which is transverse to the axis of the first straight section, and the second straight waveguide section 12 may be considered to be joined to the intermediate section 13 at a plane indicated by the dashed reference line B—B which is transverse to the axis of the second straight section 12. The first straight section has two parallel walls 11.1 and 11.2 which are opposite each other, and may in practice be either the two narrow walls or the two wide walls of a rectangular waveguide. Similarly, the second straight waveguide section 12 has two parallel walls 12.1 and 12.2 which may be either the narrow or the wide walls, respectively, of a rectangular waveguide. The inner walls 11.1 and 12.1 meet at a right angle at the intersection of the planes A—A, B—B. The outer walls 11.2 and 12.2 are joined by a curved wall section 13.2, the curvature of which will be more particularly described below.

The distance between the two walls 11.1 and 11.2 or 12.1 and 12.2 is indicated by the line $R_1$ shown in the curved section 13 of the bend. This is equal to either the "$a$" or the "$b$" dimension of a rectangular waveguide, depending on whether the bend is an H-plane bend or an E-plane bend. A line C—C bisects the angle made by the inner walls 11.1 and 12.1 of the bend. The angle made by the planes A—A and B—B is the trigonometric supplement of this angle; in the case illustrated in FIG. 1, this is also 90°. The line C—C thus bisects both the angle between the inner walls 11.1 and 12.1 and the trigonometric supplement thereof defined by the two planes A—A and B—B. The outer wall 13.2 of the curved section 13 is arcuately curved on a radius $R_2$ centered at a point P in the line C—C bisecting these angles of the bend. The curved outer wall 13.2 intersects and mates with the outer walls 11.2 and 12.2 of the straight waveguide sections at the outer edges of the planes A—A and B—B, respectively. A dotted line 13.3 is included in FIG. 1 to illustrate the position of a wall curved on the radius $R_1$ centered at the point at which the two planes A—A and B—B and the two inner walls 11.1 and 12.1 intersect and meet. This is to illustrate that the wall 13.2 used in the bend according to the invention is not curved on a radius centered at a point on the intersection of the two inner walls of the bend.

The point P is so located on the bisector line C—C that the distance X from the intersection of the two inner walls 11.1 and 12.1, or the intersection of the two planes A—A and B—B, to the outer wall, along the bisector line C—C, is smaller than the distance $R_1$, that is, smaller than the distance between the two walls 11.1 and 11.2 or 12.1 and 12.2 of either of the straight waveguide sections 11 and 12, respectively. This distance X is approximately 85 to 95 percent of the magnitude of the distance $R_1$. In the case of an H-plane bend, I have found that a magnitude of X which is equal approximately to 0.925 $R_1$ yields a good bend having nearly perfect impedance match throughout the frequency range of the waveguides 11 and 12 in the fundamental mode. Similarly, for an E-plane bend, I have found that location of the point P at which X is equal to approximately 0.866 $R_1$ yields the same beneficial results.

Referring to FIGS. 2 and 3, an H-plane bend is shown comprising a first straight rectangular waveguide section 21 having narrow walls 21.1 and 21.2, and a second similar straight rectangular waveguide section 22 having narrow walls 22.1 and 22.2 each joined to a curved section 23, in the manner illustrated above in connection with FIG. 1. The two inner walls 21.1 and 22.1 are joined at a right angle and the curved section has an outer wall 23.2 which is curved in the manner described above in connection with FIG. 1 and which joins the two outer walls 21.2 and 22.2 of the straight waveguide sections. The broader wide walls 21.3 and 21.4 of the first straight waveguide section 21 are parallel to the corresponding walls (not shown) of the second straight waveguide section 22 and each pair of corresponding walls lies in a common plane. At the planes A—A and B—B (not shown in FIG. 2) inductive iris elements 24.1 and 24.2 may be provided on the curved wall 23.2 of the intermediate curved section 23. These inductive iris elements are attached to the inner surface of the curved wall 23.2 at the regions where the curved wall joins the outer walls 21.2 and 22.2 and they project inwardly toward the inner walls 21.1 and 22.1 of the bend. FIG. 3 illustrates one of these tuning elements 24.2 in plan view showing that it extends transversely across the full inner surface of the narrow wall 21.2 of the first straight waveguide section 21. The inductive iris elements 24.1 and 24.2 serve to match out any slight impedance discontinuity.

FIGS. 4 and 5 illustrate a bend according to the invention in the E-plane. In FIG. 4 a first straight waveguide section 31, having an inner wide wall 31.1 and an outer wide wall 31.2, and a second straight waveguide section 32 having an inner wide wall 32.1 and an outer wide wall 32.2, are joined to an intermediate curved section 33, again in the same fashion as is described above in connection with FIG. 1. The intermediate curved section has an outer curved wall 33.2, the curvature of which is determined in accordance with FIG. 1, and the inner walls 31.1 and 32.1 of the two waveguide sections meet each other at a right angle. The section line 5—5 in FIG. 4 is taken along this bisector line (C—C in FIG. 1). Thus, in FIG. 5, the junction of the inner walls 31.1 and 32.1, referenced in this figure as 35, is shown wider than the cross section of the outer curved wall 33.2 of the bent section 33.

Many variations of the invention are possible. For example, a bend according to the invention can be made consisting solely of an intermediate bend section lying between the planes A—A and B—B in FIG. 1, with or without suitable means for joining such a section to straight rectangular waveguide portions 11 and 12, or 21 and 22 in FIG. 2, or 31 and 32 in FIG. 4. It is only necessary that the angle between the planes A—A and B—B be defined in the structure of such a curved section in order that the desired angle between the straight waveguide sections to be attached to it may be achieved. Also, the bend is not limited to a 90° angle. Bends of other angular values are possible, and, in such a case, it will be appreciated that the angle between the inner walls 11.1 and 12.1 and the angle between the planes A—A and B—B are the trigonometric supplements of each other and that the line C—C (in FIG. 1) which bisects one will also bisect the other. Further, it is not necessary that two inductive iris elements, as shown in FIG. 2, be used. In some cases a single iris element will be adequate for the purpose or use of the bend which is intended.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. For use in effecting an abrupt change in the axial direction of a rectangular waveguide, a bent rectangular waveguide section of zero inside radius having a bent intermediate portion, and straight end portions axially disposed relative to each other at the desired angle of said change, each end portion meeting said intermediate bent portion in a plane substantially normal to the axis of said end portion, said planes intersecting each other at a second angle which is the trigonometric supplement of said desired angle in a line common to first walls of each end portion which meet substantially at said line and constitute the inner wall of said bent waveguide section, the outer wall of said intermediate portion between said planes mating with and joining the second walls of each end portion opposite said respective first walls and being arcuately curved on a constant radius centered at a point lying within and on the bisector of the angle of said inner wall, said point being so located that the length of the portion of said radius bisecting said second angle from said inner wall to said outer wall of said intermediate portion is of the order of ten percent less than the distance between said first and second walls in either of said end portions.

2. A bent rectangular waveguide according to claim 1 including inductive iris means projecting into said bent intermediate portion from at least one wall thereof.

3. A bent rectangular waveguide according to claim 2 in which said iris means is a conductive rib attached to and extending completely across the inner surface of said wall.

4. A bent rectangular waveguide according to claim 1 including conductive iris means comprising a conductive element projecting into said bent intermediate portion from a narrow waveguide wall.

5. For use in effecting an abrupt rectangular change in the axial direction of a rectangular waveguide, a bent rectangular waveguide section of a zero inside radius having an intermediate bent portion, and straight end portions axially disposed at an angle of ninety degrees with respect to each other, each end portion meeting said intermediate bent portion in a plane substantially normal to the axis of said end portion, said planes intersecting each other at an angle of ninety degrees in a line common to first walls of each end portion which meet substantially at an angle of ninety degrees at said line and constitute the inner wall of said bent waveguide section, the outer wall of said intermediate portion between said planes mating with and joining the second walls of each end portion opposite said respective first walls and being arcuately curved on a constant radius centered at a point lying within and on the bisector of the angle of said inner wall, said point being so located that the length of the portion of said radius bisecting the angle between said planes from said inner wall to said outer wall of said intermediate portion is of the order of ten percent less than the distance between said first and second walls in either of said end portions.

6. For use in effecting an abrupt change in the axial direction of a rectangular waveguide in the H-plane, a bent rectangular waveguide section of zero inside radius having a bent intermediate portion, and straight end portions axially disposed relative to each other at the desired angle of said change with their respective narrow walls disposed at said angle and their respective wide walls lying in common planes, each end portion meeting said intermediate bent portion in a plane substantially normal to the axis of said end portion, said axially normal planes intersecting each other at a second angle, which is the trigonometric supplement of said desired angle, in a line common to first narrow walls of each end portion which meet substantially at said line and constitute the inner narrow wall of said bent waveguide section, the outer narrow wall of said intermediate portion between said planes mating with and joining the second narrow walls of each end portion and being arcuately curved on a constant radius centered at a point lying within and on the bisector of the angle of said inner narrow wall, said point being so located that the length of the portion of said radius bisecting said second angle from said inner narrow wall to said outer narrow wall of said intermediate portion is approximately 90 percent of the distance between said first and second narrow walls in either of said end portions.

7. A bent rectangular waveguide section according to claim 6 in which said desired angle is substantially ninety degrees and the length of said portion of said radius bisecting said second angle from said inner narrow wall to said outer narrow wall of said intermediate portion is approximately 0.925 of said distance between said first and second narrow walls.

8. A bent rectangular waveguide according to claim 7 including inductive iris means comprising first and second conductive elements projecting into said bent intermediate portion one from the region of each junction of said outer narrow wall with said second narrow walls of each end portion.

9. For use in effecting an abrupt change in the axial direction of a rectangular waveguide in the E-plane, a bent rectangular waveguide section of zero inside radius having a bent intermediate portion, and straight end portions axially disposed relative to each other at the desired angle of said change with their respective wide walls disposed at said angle and their respective narrow walls lying in common planes, each end portion meeting said intermediate bent portion in a plane substantially normal to the axis of said end portion, said planes intersecting each other at a second angle, which is the trigonometric supplement of said desired angle, in a line common to first wide walls of each end portion which meet substantially at said line and constitute the inner wide wall of said bent waveguide section, the outer wide wall of said intermediate portion between said planes mating with and joining the second wide walls of each end portion and being arcuately curved on a constant radius centered at a point lying within and on the bisector of the angle of said inner wide wall, said point being so located that the length of the portion of said radius bisecting said second angle from said inner wide wall to said outer wide wall of said intermediate portion is approximately 85 percent of the distance between said first and second wide walls in either of said end portions.

10. A bent rectangular waveguide section according to claim 9 in which said desired angle is substantially ninety degrees and the length of said portion of said radius bisecting said second angle from said inner wide wall to said outer wide wall of said intermediate portion is approximately 0.866 of said distance between said first and second wide walls.

11. For use in effecting a rectangular change in the axial direction of a rectangular waveguide transmission line, a bent rectangular waveguide section of zero inside radius having first and second similar rectangular waveguide openings at planes disposed at a right angle to each other, the respective inner boundaries of said openings lying substantially in a common line, said section having an outer wall extending between the respective outer boundaries of said openings, said outer wall being arcuately curved on a constant radius longer than the distance between the outer and inner boundaries of either of said openings and centered at a point in the line bisecting the angle between said planes such that the length of the portion of said radius within said section along said line is of the order of ten percent less than said distance.

12. A bent rectangular waveguide section according to claim 11 including inductive iris means projecting partway into said section from the interior surface of at least one wall thereof.

13. A bent rectangular waveguide section according to claim 12 in which said iris means is comprised of one or more conductive ribs each attached to an inner wall surface and extending completely across said surface.

14. For use in effecting a rectangular change in the axial direction of a rectangular waveguide transmission line in the H-plane, a bent rectangular waveguide section of zero inside radius having first and second similar rectangular waveguide openings at planes disposed at a right angle to each other, the corresponding longer sides of said openings being disposed respectively in first and second parallel planes defining the wide walls of said section, one shorter side of each opening being further from the apex of said angle than the other, said other shorter sides lying substantially in a common line at said apex, said section having an outer wall extending between said further sides, said outer wall being arcuately curved on a constant radius longer than the distance between the shorter sides of either of said openings and centered at a point in the line bisecting the angle between said planes such that the length of the portion of said radius within said section along said line is approximately 0.925 of said distance.

15. A bent rectangular waveguide section according to claim 14 including inductive iris means comprising first and second conductive elements projecting part-way across said first and second openings, respectively, from said further side of each toward said apex.

16. For use in effecting a rectangular change in the axial direction of a rectangular waveguide transmission line in the E-plane, a bent rectangular waveguide section of zero inside radius having first and second similar rectangular waveguide openings at planes disposed at a right angle to each other, the corresponding shorter sides of said openings being disposed, respectively, in first and second parallel planes defining the narrow walls of said section, one longer side of each opening being further removed from the apex of said angle than the other, said other longer sides lying substantially in a common line at said apex, said section having an outer wall extending between said further sides, said outer wall being arcuately curved on a constant radius longer than the distance between the longer sides of either of said openings and centered at a point in the line bisecting the angle between said planes such that the length of the portion of said radius within said section along said line is approximately 0.866 of said distance.

References Cited in the file of this patent

UNITED STATES PATENTS

| 2,411,338 | Roberts | Nov. 19, 1946 |
| 2,640,877 | Miller et al. | June 2, 1953 |
| 2,673,962 | Kock | Mar. 30, 1954 |
| 2,810,111 | Cohn | Oct. 15, 1957 |

FOREIGN PATENTS

| 732,443 | Great Britain | June 22, 1955 |